Patented Dec. 28, 1948

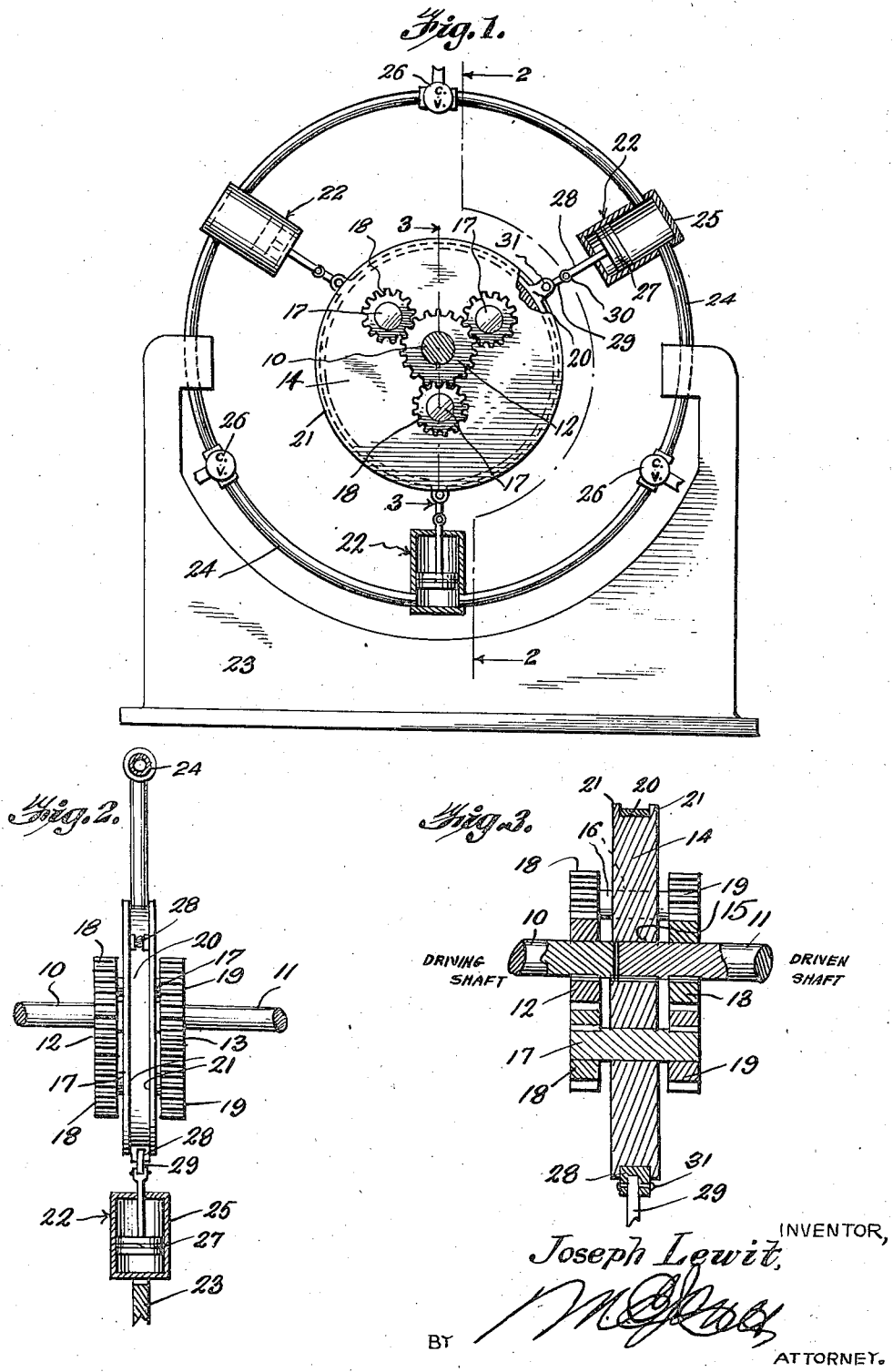

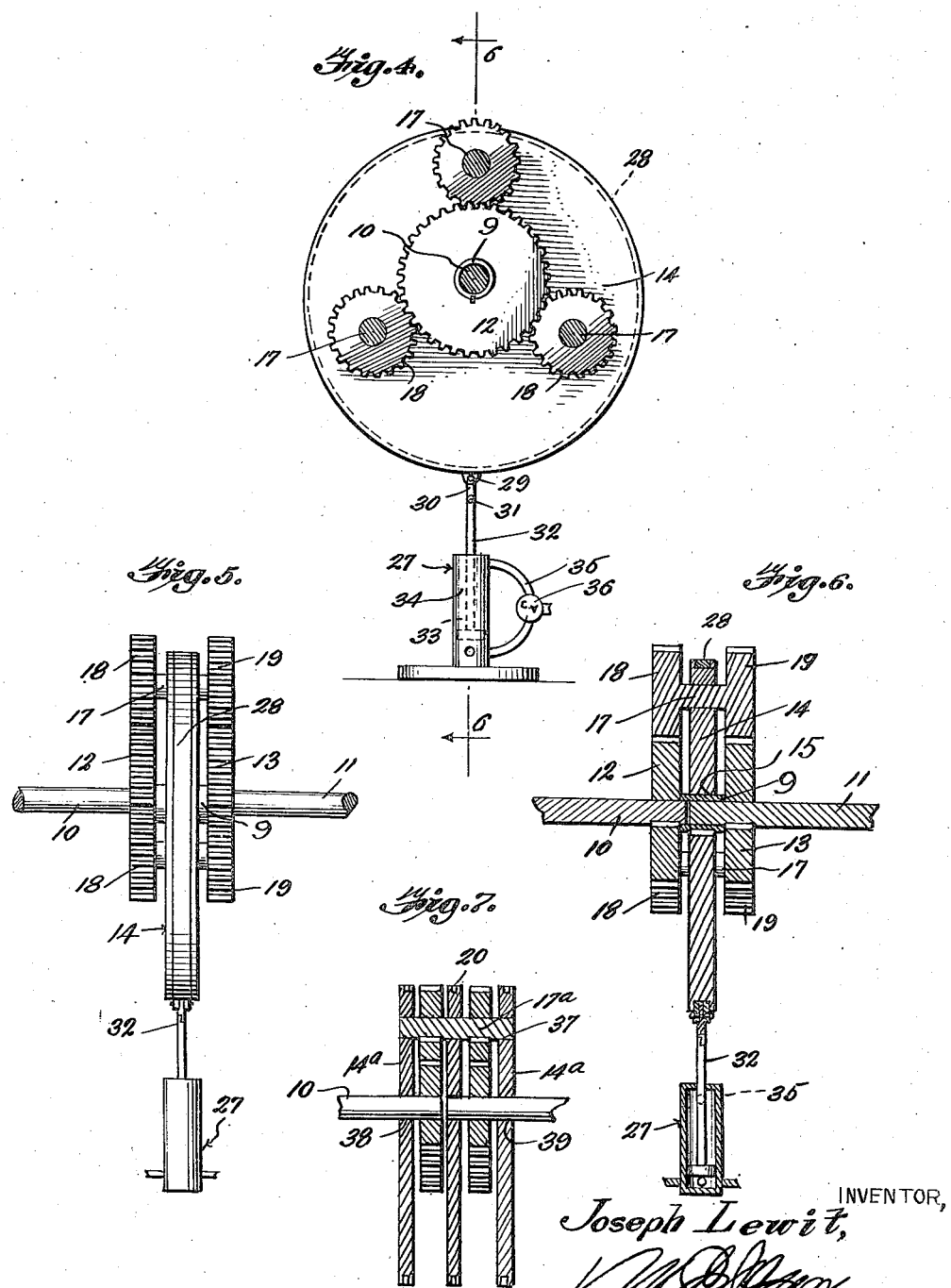

2,457,385

UNITED STATES PATENT OFFICE 2,457,385

UNIVERSAL REDUCTION GEAR TRANSMISSION

Joseph Lewit, Washington, D. C.

Application September 11, 1945, Serial No. 615,540

2 Claims. (Cl. 74—293)

This invention relates to a universal reduction gear or transmission mechanism and aims to provide an internal construction wherein a driving shaft may selectively operate a driven shaft, without shifting of gears, but according to variable regulation of the flow of fluid, either a liquid or air.

Especially an object is to provide a variable speed gear or transmission of this character which will enable the same and other results as usual variable speed transmission to be attained by mechanism of materially smaller size, of greatly less weight, and at considerably less cost.

Further, an object is to provide a variable speed transmission comprising driving and driven shafts having gear wheels rigid thereon, in combination with normal movable plates or disks, planetary gears enmeshed with the first-mentioned gear-wheels and carried by shafts journaled on the plates or disks, and pump mechanism operable by said normal movable plates or disks which include a valve operable to various positions in order to control the flow of fluid so that the driven shaft may be idle or may be driven at various speeds without the shifting of gears.

Various additional objects and advantages will in part be pointed out hereinafter and otherwise will become apparent from a consideration of the description following, taken in connection with the the accompanying drawings illustrating operative embodiments by way of example, and wherein:

Fig. 1 is a view of the novel gear or transmission mechanism primarily in side elevation but partly in section to disclose details;

Fig. 2 is a vertical sectional view taken approximately on the line 2—2 of Fig. 1;

Fig. 3 is a vertical section taken approximately on the line 3—3 of Fig. 1;

Fig. 4 is a view in side elevation, partly in section, illustrating a modified form of the invention;

Fig. 5 is an edge elevation of the parts of Fig. 4;

Fig. 6 is a vertical section taken on the line 6—6 of Fig. 4; and

Fig. 7 is a view taken on a plane corresponding to Figs. 3 and 6, but to a third or final modified form.

Referring specifically to the drawings, and first to the form of Figs. 1 to 3, 10 designates a driving shaft which may be operated by any means or source of power, and which is aligned with a separate or driven shaft 11. Keyed or otherwise rigid on the shafts 10 and 11 are gear-wheels 12 and 13, respectively. At 14 is disclosed a relatively large disk or plate having a bearing opening 15 which loosely receives the adjacent end of the driven shaft 11. Suitably journalled in bearing openings 16 of the disk or plate 14 are any desired number of short shafts 17 having rigid therewith planetary gear-wheels 18 and 19, respectively, enmeshed with the gear-wheels 12 and 13, respectively.

Said plate or disk 14 is eccentrically disposed with respect to the axes of the shafts 10 and 11 or otherwise shaped and arranged so as to be a cam. A ring or endless strap 20 is loosely mounted on the periphery of the cam disk or plate 14 and held against displacement therefrom by outward annular flanges at 21 in order to operate any desired number of pumps 22 equidistantly spaced in a circle concentric with the axes of shafts 10 and 11.

A suitable base or support 23 mounts a ring or annular pipe or conduit 24 concentric with respect to the axes of shafts 10 and 11. Rigidly carried by the conduit or ring 24 are equidistantly spaced cylinders 25, constituting parts of the aforesaid pumps 22, and attention is called to the fact that the ring or conduit 24 is in sections which communicate with the cylinders 25 adjacent their outer ends. The sections of the conduit 24 between the cylinders mount suitable manually operable check-valves 26. Slidable in the cylinders 25 are pistons 27 having rods 28 extending therefrom, and by means of links 29 and pivots at 30 and 31 they are operatively attached to the strap 20. As a result of the construction described, with shaft 10 driven or operating in either direction, and with the throttle-valves 26 fully open, the planetary gear-wheels 18 will travel idly orbitally about the same axis of said shaft, the shafts of the planetary gears rotating in the cam plate 14. However, in order to drive shaft 11, one valve 26 is manually adjustable to partly throttle the flow of fluid in the conduit 24 and through cylinders 25, thus to present resistance to the operation of pistons 27, so that cam plate or disk 14 will rotate on the axes of the shafts 10 and 11 with the planetary movement of the gear-wheels 18 and 19, cam plate 14 thus actuating the strap or eccentric ring 20 and accordingly actuating the piston 27. In this way, as explained in the two preceding sentences respectively, driven shaft 11 may remain idle while shaft 10 operates, and said shaft 11 may be driven at any of various speeds according to the various adjustments permissible for the throttle-valves 26.

Attention is called to the fact that the improved gear or transmission mechanism is not limited to any particular use, but may be employed as such generally as in connection with self-propelled vehicles, marine motors, stationary motors and otherwise without limitation.

Various changes may be resorted to without departing from the spirit and scope of the invention. For instance, I may use the form disclosed in Figs. 4 to 6, which differs essentially from that of Fig. 1 in the use of a single pump at 27, rather than a plurality as in the first form. In this form, the description and operation of the parts designated 10 to 21 are the same as in the preceding form, and the same reference characters have been applied. However, the eccentric strap 28 replaces that at 20, having pivotal connection at 29 to a link 30 in turn pivoted at 31 to a rod 32 of a piston 33 operable within a cylinder 34. A sleeve bearing 9 keyed to plate 14, lines opening 15. The parts 33 and 34 constitute the pump 27 for example. On opposite sides of the piston 33, a conduit or pipe 35 communicates with the interior of the cylinder 34, and this cylinder and conduit are filled with a fluid like the cylinder 25 and conduit 24 in order that the flow thereof may be either free or may be varied through the manipulation of a throttle-valve 36, to control the driven shaft, that is to permit the same to remain idle or to be operated at any of various speeds as in the preceding form.

With reference to the disclosure of Fig. 7, concerning a final modified form, the same may be incorporated into either of the first and second forms. It differs therefrom only in the fact that instead of the annular cam plate or disk 14, I employ a plurality, for instance three. The same reference characters as used in the preceding forms have been applied to like parts in Fig. 7. The additional cams or plates corresponding to 14 are designated 14ª, and it will be noted that shafts 17ª corresponding to the shafts 17 are longitudinally extended and are journaled in bearing openings 37 in the plates or disks 14ª. Shaft 10 extends loosely through an opening 38 in one of the plates 14ª and the shaft 11 extends loosely through a corresponding bearing opening 39 in the other plate 14ª. Only one of the plates, namely that at 14, may be used to operate pumping mechanism through the strap 20 of equivalent, but two of said plates or even all of them, may be used through the medium of such straps 20, or equivalent to operate the same pumps such as 22 in Fig. 1, or each operate a separate series of pumps, as preferred.

Various changes may be resorted to, provided they fall within the spirit and scope of the invention.

I claim as my invention:

1. Apparatus of the class described having a driving shaft, a driven shaft, gears rigid on said shafts, a plate loose with respect to said shafts, second shafts, said second shafts being journaled in said plate, planetary gears on said second shafts on opposite sides of the plate, said plate having a bearing opening into which one of the first-mentioned shafts extends, said planetary gears being enmeshed with the first-mentioned gears, an endless fluid conduit surrounding said plate, a throttle valve in said conduit, a pump cylinder intersected and carried by the conduit, piston means for the pump cylinder operable by the periphery of said plate and a support for the apparatus in engagement with said endless fluid conduit.

2. Apparatus of the class described having a driving shaft, a driven shaft, gears rigid on said shafts, a plate loose with respect to said shafts having a non-circular cam periphery, second shafts, said second shafts being journaled in said plate extending beyond opposite sides thereof, planetary gears on said second shafts on opposite sides of the plate, said plate having a bearing opening into which one of the first-mentioned shafts extends, said planetary gears being enmeshed with the first-mentioned gears, a strap loosely surrounding the periphery of said plate, an endless fluid conduit concentric with the axis of the driving shaft, cylinders intersected by and in communication with the conduit and equidistantly mounted thereby, piston means in the cylinders operable by said strap, throttle valve means for said conduit and a support for the apparatus in engagement with said endless fluid conduit.

JOSEPH LEWIT.

REFERENCES CITED

The following references are of record in the file of this patent:

UNITED STATES PATENTS

| Number | Name | Date |
|---|---|---|
| 999,660 | Koppel | Aug. 1, 1911 |
| 1,153,261 | Scheibner | Sept. 14, 1915 |
| 1,170,058 | Fay | Feb. 1, 1916 |
| 2,232,252 | Mathey | Feb. 18, 1941 |

FOREIGN PATENTS

| Number | Country | Date |
|---|---|---|
| 248,479 | Italy | Apr. 2, 1926 |
| 853,766 | France | Mar. 28, 1940 |